US011623683B2

United States Patent
Versical et al.

(10) Patent No.: US 11,623,683 B2
(45) Date of Patent: Apr. 11, 2023

(54) VEHICLE POWER STEERING TEST SYSTEM CONTROL

(71) Applicants: GM GLOBAL TECHNOLOGY OPERATIONS LLC, Detroit, MI (US); MTS Systems Corporation, Eden Prairie, MN (US)

(72) Inventors: Jarred James Versical, Commerce Township, MI (US); Bo Yu, Novi, MI (US); Ian Y. Hwa, West Bloomfield, MI (US); Jonathan Howard Johnston, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 32 days.

(21) Appl. No.: 17/304,801

(22) Filed: Jun. 25, 2021

(65) Prior Publication Data

US 2022/0410964 A1     Dec. 29, 2022

(51) Int. Cl.
    *G01M 17/06*     (2006.01)
    *B62D 5/04*      (2006.01)

(52) U.S. Cl.
    CPC .......... *B62D 5/0487* (2013.01); *B62D 5/049* (2013.01); *G01M 17/06* (2013.01)

(58) Field of Classification Search
    CPC ...... B62D 5/0487; B62D 5/049; G01M 17/06
    See application file for complete search history.

(56) References Cited

U.S. PATENT DOCUMENTS

| | | | |
|---|---|---|---|
| 2007/0089534 A1* | 4/2007 | Chang | G01M 13/025 73/862.08 |
| 2010/0138109 A1* | 6/2010 | Wang | B62D 5/0472 701/99 |
| 2011/0066338 A1* | 3/2011 | Andrasko | F02D 41/1497 123/406.12 |
| 2012/0173079 A1* | 7/2012 | Oblizajek | G01M 17/06 701/41 |
| 2014/0371989 A1* | 12/2014 | Trimboli | B62D 6/10 701/41 |
| 2016/0288831 A1* | 10/2016 | Lee | B60W 30/12 |
| 2016/0305852 A1* | 10/2016 | Oblizajek | G01M 17/06 |
| 2017/0088163 A1* | 3/2017 | West | B62D 5/0457 |
| 2019/0016375 A1* | 1/2019 | Vijayakumar | B60G 17/0162 |
| 2019/0176876 A1* | 6/2019 | Hwa | B62D 5/0481 |
| 2019/0359252 A1* | 11/2019 | Yu | B62D 15/022 |
| 2019/0383707 A1* | 12/2019 | Yu | G01L 5/221 |
| 2020/0277005 A1* | 9/2020 | Loussaut | B62D 5/0463 |
| 2020/0391792 A1* | 12/2020 | Loussaut | B62D 5/0457 |

(Continued)

*Primary Examiner* — Eric S. McCall
(74) *Attorney, Agent, or Firm* — Lorenz & Kopf LLP

(57) ABSTRACT

In an exemplary embodiment, a test system is provided for testing a power steering system for a vehicle, the test system including a motor, one or more sensors, and a processor. The one or more sensors are configured to obtain sensor data pertaining to the motor. The processor is coupled to the one or more sensors and to the motor, and is configured to: determine, using the sensor data, a desired position of the motor for providing a desired amount of torque to the power steering system in order to reach one or more target behaviors: an inertia target, a spring target, a damper target, or a friction target for the power steering system; and provide instructions for the motor to move to the desired position for providing torque to the power steering system.

20 Claims, 2 Drawing Sheets

(56) References Cited

U.S. PATENT DOCUMENTS

2021/0164869 A1* 6/2021 Loussaut .............. G01M 17/06
2021/0302291 A1* 9/2021 Kim ........................ G01N 3/02
2022/0144341 A1* 5/2022 Takhmar ............. B62D 15/025
2022/0194377 A1* 6/2022 Otanez ................. B60W 40/08
2022/0250673 A1* 8/2022 Lin ..................... B62D 5/0487

* cited by examiner

VEHICLE POWER STEERING TEST SYSTEM CONTROL

INTRODUCTION

The technical field generally relates to vehicles and, more specifically, to methods and systems for controlling a test system for a vehicle power steering system.

Certain vehicles today are equipped with a power steering system, such as an electric power steering system. A test system may be utilized for testing the power steering system. However, such existing test systems may not always provide optimal testing for the power steering system.

Accordingly, it is desirable to provide improved methods and systems for testing power steering systems of vehicles. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a test system for testing a power steering system for a vehicle, the test system including a motor, one or more sensors, and a processor. The one or more sensors are configured to obtain sensor data pertaining to the motor. The processor is coupled to the one or more sensors and to the motor, and is configured to: determine, using the sensor data, a desired position of the motor for providing a desired amount of torque to the power steering system in order to reach one or more target behaviors: an inertia target, a spring target, a damper target, or a friction target for the power steering system; and provide instructions for the motor to move to the desired position for providing torque to the power steering system.

Also in an exemplary embodiment, the processor is configured to: determine, using the sensor data, a desired acceleration of the motor for providing the desired amount of torque to the power steering system in order to reach the target behavior for one or more of the inertia, spring, damper, or friction to the power steering system; and determined the desired position of the motor based on the desired acceleration of the motor.

Also in an exemplary embodiment, the processor is configured to determine the desired position of the motor by: taking a first mathematical integral of the desired acceleration, resulting in a desired velocity of the motor; and taking a second mathematical integral of the desired velocity, resulting in the desired position of the motor.

Also in an exemplary embodiment, the processor is configured to: determine an amount of torque for testing that is attributable to inertia; determine an amount of inertia for testing; and determine the desired acceleration of the motor based on both: the amount of torque for testing that is attributable to inertia; and the amount of inertia.

Also in an exemplary embodiment, the processor is configured to determine the desired acceleration of the motor by dividing the amount of torque for testing that is attributable to inertia by the amount of inertia.

Also in an exemplary embodiment, the processor is configured to determine the amount of torque for testing that is attributable to inertia based on: a total amount of torque for the motor; a stiffness contribution for the total amount of torque; and a viscosity contribution for the total amount of torque.

Also in an exemplary embodiment, the sensor data include the desired velocity and angle of the motor based on the desired acceleration over time; and the processor is configured to: calculate the stiffness contribution using the angle of the motor; and calculate the viscosity contribution using the velocity of the motor.

In another exemplary embodiment, a control system is provided for a test system for testing a power steering system for a vehicle, the test system having a motor, and the control system including one or more sensors and a processor. The one or more sensors are configured to obtain sensor data pertaining to the motor. The processor is coupled to the one or more sensors and to the motor, and is configured to: determine, using the sensor data, a desired position of the motor for providing a desired amount of torque to the power steering system in order to reach one or more target behaviors: an inertia target, a spring target, a damper target, or a friction target for the power steering system; and provide instructions for the motor to move to the desired position for providing torque to the power steering system.

Also in an exemplary embodiment, the processor is configured to: determine, using the sensor data, a desired acceleration of the motor for providing the desired amount of torque to the power steering system in order to reach the target behavior for one or more of the inertia, spring, damper, or friction target for the power steering system; and determined the desired position of the motor based on the desired acceleration of the motor.

Also in an exemplary embodiment, the processor is configured to determine the desired position of the motor by: taking a first mathematical integral of the desired acceleration, resulting in a desired velocity of the motor; and taking a second mathematical integral of the desired velocity, resulting in the desired position of the motor.

Also in an exemplary embodiment, the processor is configured to: determine an amount of torque for testing that is attributable to inertia; determine an amount of inertia for testing; and determine the desired acceleration of the motor based on both: the amount of torque for testing that is attributable to inertia; and the amount of inertia.

Also in an exemplary embodiment, the processor is configured to determine the amount of torque for testing that is attributable to inertia based on: a total amount of torque for the motor; a stiffness contribution for the total amount of torque; and a viscosity contribution for the total amount of torque.

Also in an exemplary embodiment, the sensor data includes an angle for the motor and a velocity of the motor; and the processor is configured to: calculate the stiffness contribution using the angle of the motor; and calculate the viscosity contribution using the velocity of the motor.

In another exemplary embodiment, a control system is provided for a test system for testing a power steering system for a vehicle, the test system having a motor, and the control system including one or more sensors and a processor.

In another exemplary embodiment, a method is provided for testing a power steering system for a vehicle using a test system having a motor, the method including: obtaining, via one or more sensors, sensor data pertaining to the motor; determining, via a processor using the sensor data, a desired position of the motor for providing a desired amount of torque to the power steering system in order to reach one or more target behaviors: an inertia target, a spring target, a damper target, or a friction target for the power steering system; and providing, via the processor, instructions for the motor to move to the desired position for providing torque to the power steering system.

Also in an exemplary embodiment, the step of determining the desired position includes: determining, via the processor using the sensor data, a desired acceleration of the motor for providing the desired amount of torque to the power steering system in order to reach the target behavior for one or more of the inertia, spring, damper, or friction target for the power steering system; and determining, via the processor, the desired position of the motor based on the desired acceleration of the motor.

Also in an exemplary embodiment, the step of determining the desired position of the motor based on the desired acceleration of the motor includes: taking, via the processor, a first mathematical integral of the desired acceleration, resulting in a desired velocity of the motor; and taking, via the processor, a second mathematical integral of the desired velocity, resulting in the desired position of the motor.

Also in an exemplary embodiment, the method further includes: determining, via the processor, an amount of torque for testing that is attributable to inertia; determining, via the processor, an amount of inertia for testing; and determining, via the processor, the desired acceleration of the motor based on both: the amount of torque for testing that is attributable to inertia; and the amount of inertia.

Also in an exemplary embodiment, the desired acceleration of the motor is determined by the processor by dividing the amount of torque for testing that is attributable to inertia by the amount of inertia.

Also in an exemplary embodiment, the determining of the amount of torque for testing that is attributable to inertia is based on: a total amount of torque for the motor; a stiffness contribution for the total amount of torque; and a viscosity contribution for the total amount of torque.

Also in an exemplary embodiment, the sensor data includes an angle for the motor and a velocity of the motor; and the processor further includes: calculating, via the processor, the stiffness contribution using the angle of the motor; and calculating, via the processor, the viscosity contribution using the velocity of the motor.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
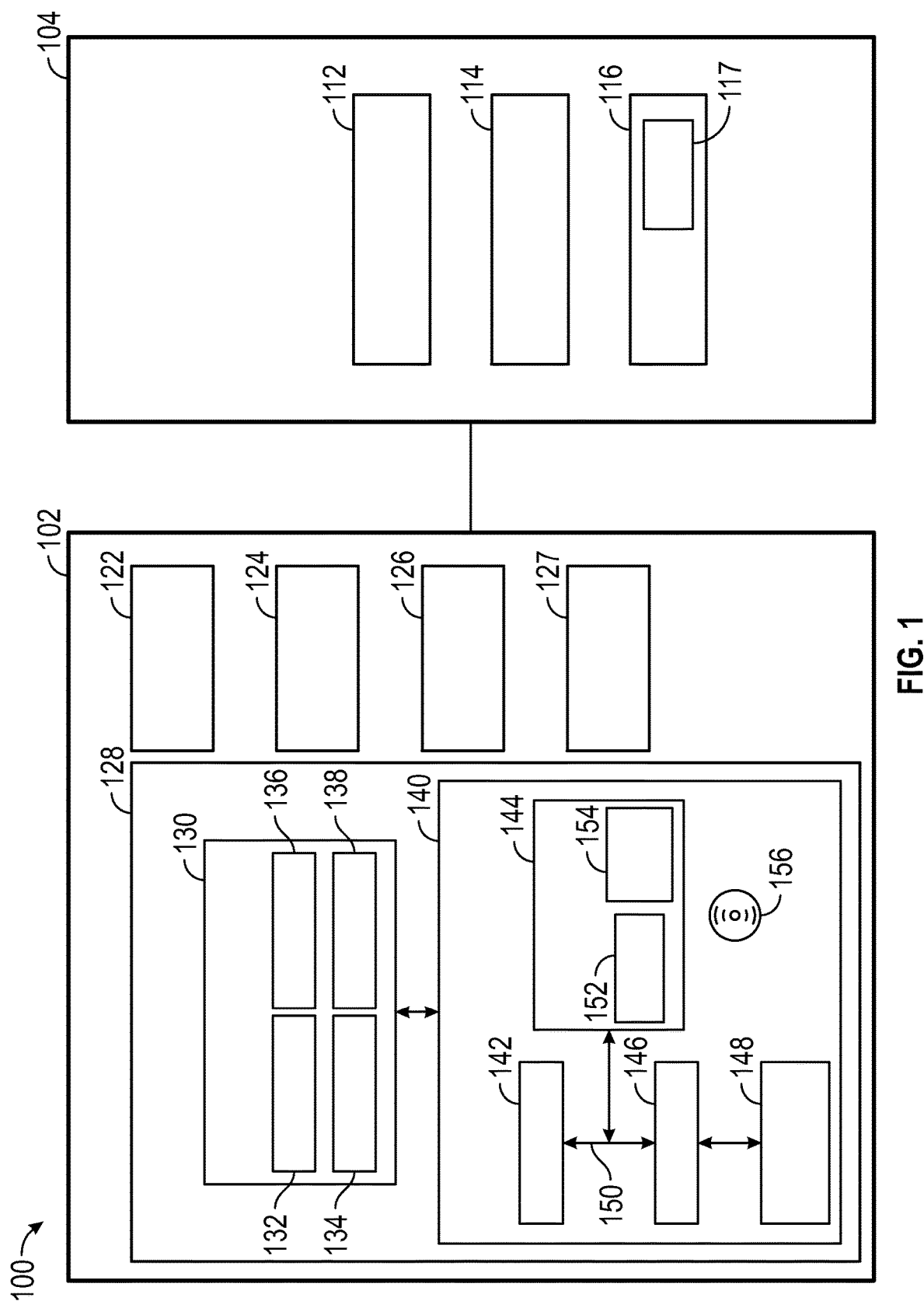
FIG. 1 is a functional block diagram of a system that includes a test system and a vehicle power steering system under test, in accordance with exemplary embodiments.

FIG. 1 illustrates a system 100. In various embodiments, and as described below, the system 100 includes a test system 102 and a vehicle power steering system 104. In various embodiments, the test system 102 is configured to provide testing for the vehicle power steering system 104.

In various embodiments, the power steering system 104 comprises an electric power steering system for use in a vehicle. In various, embodiments, the power steering system 104 may be utilized in any number of different types of vehicles (not depicted), such as, by way of example, any one of a number of different types of automobiles, such as, for example, a sedan, a wagon, a truck, or a sport utility vehicle (SUV), such as two-wheel drive (2WD) (i.e., rear-wheel drive or front-wheel drive), four-wheel drive (4WD) or all-wheel drive (AWD), and/or various other types of vehicles in certain embodiments. In certain embodiments, the power steering system 104 may also be used in connection with motorcycles and/or other vehicles, such as aircraft, spacecraft, watercraft, and so on, and/or one or more other types of mobile platforms.

As depicted in FIG. 1, in various embodiments, the power steering system includes a motor 112, a rack and pinion device 114, and a damper 116 that includes a spring 117. It will be appreciated that FIG. 1 provides a simplified depiction, and that the power steering system 104 may also include a number of other components.

In various embodiments, the test system 102 controls operation of the power steering system 104 when the power steering system 104 is removed from its vehicle and is serving as a "system under test" for the test system 102. Also in various embodiments, the test system 102 performs testing for the power steering system 104 while operating the power steering system 104 in a controlled environment with the application of specified amounts of torque by the test system 102.

As depicted in FIG. 1, in various embodiments, the test system 102 includes a housing 122, connecting apparatus 124, a platform 126, a motor 127, and a control system 128. In various embodiments, the platform 126 is disposed within or formed by the housing 122, and is configured for placement of the power steering system 104 thereon. In certain embodiments, the platform 126 comprises a bench and/or other resting platform on which the power steering system 104 may be placed while testing is performed on the power steering system 104. Also in various embodiments, the connecting apparatus 124 connects the test system 102 to the power steering system 104 is placed on the platform 126, and provides torque to the power steering system 104 for testing of the power steering system 104 via the motor 127. In addition, in various embodiments, the motor 127 provides the torque to the power steering system 104 via instructions provided by the control system 128 (including via a processor 142 thereof, described further below) for testing of the power steering system 104.

Also as depicted in FIG. 1, in various embodiments, the control system 128 includes a sensor array 130 and a controller 140. In various embodiments, the control system 128 provides instructions for the motor 127 to selectively apply torque to the power steering system 104 during testing. In various embodiments, the control system 128 provides the instructions by replicating the power steering system 104 by reverse calculating a position movement of the motor 127, in accordance with the process 200 described further below in connection with FIG. 2.

While the control system 128 is depicted separate from the motor 127 (and other components) in FIG. 1, it will be appreciated that in certain embodiments the motor 127 (and/or other components of the test system 102) may also be part of and/or incorporated into the control system 128.

In various embodiments, as depicted in FIG. 1, the control system 128 includes a sensor array 130 and a controller 140.

In various embodiments, the sensor array 130 includes one or more torque sensors 132 and angle sensors 134 (e.g., steering angle sensors). Also as depicted in FIG. 1, in various embodiments the sensor array 130 also includes one or more velocity sensors 136 (e.g., wheel speed sensors) and/or acceleration sensors 138 (e.g., accelerometers). In various embodiments, the various sensors of the sensor array 130 measure respective sensor values in collecting sensor data that is used by the controller 140 (including the processor 142 thereof) for controlling the motor 127 and testing for the power steering system 104 in accordance with the process 200 described further below in connection with FIG. 2.

Also as depicted in FIG. 1, in various embodiments the controller 140 comprises a computer system that includes a processor 142, a memory 144, an interface 146, a storage device 148, and a computer bus 150. In various embodiments, the controller (or computer system) 140 controls the testing of the power steering system 104, including controlling of torque provided by the motor 127 to the power steering system 104 during testing. In various embodiments, the processor 142 performs these functions by replicating the power steering system 104 by reverse calculating a position movement of the motor 127, in accordance with the process 200 described further below in connection with FIG. 2.

In various embodiments, the controller 140 (and, in various embodiments, the control system 128 itself) is disposed within the housing 122 of the test system 102. In certain embodiments, the controller 140 and/or control system 128 and/or one or more components thereof may be disposed in whole or in part outside the housing 122, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of the system 100.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140, and the test system 102 in general, in executing the processes described herein, such as the process 200 of FIG. 2.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with one or more stored values (e.g., one or more predetermined threshold values for use in connection with the process 200 of FIG. 2).

The bus 150 serves to transmit programs, data, status and other information or signals between the various components of the computer system of the controller 140. The interface 146 allows communication to the computer system of the controller 140, for example from a system driver and/or operator and/or another computer system, and can be implemented using any suitable method and apparatus. In one embodiment, the interface 146 obtains the various data from the sensor array 130 and/or other components of the system 100. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process 200 of FIG. 2. In another exemplary embodiment, the program product may be directly stored in and/or otherwise accessed by the memory 144 and/or a disk (e.g., disk 156), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

Figure 2:
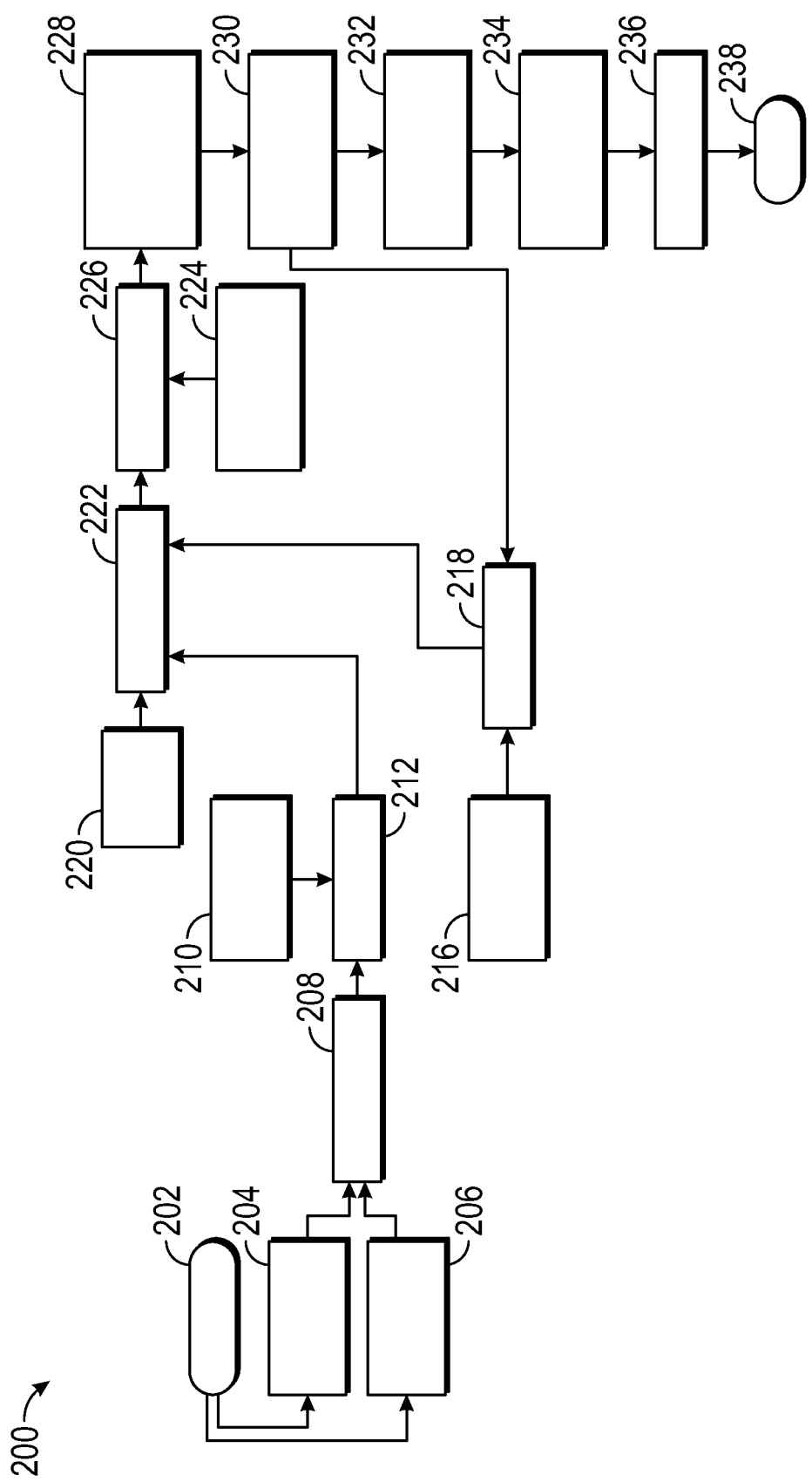
FIG. 2 is a flowchart of a process for controlling a test system for testing a vehicle power steering system, and that can be utilized in connection with the system, including the test system and vehicle power steering system of FIG. 1, in accordance with exemplary embodiments.

With reference to FIG. 2, a flowchart is provided of a process 200 for controlling a test system for testing a vehicle power steering system, in accordance with exemplary embodiments. The process can be implemented in connection with the system 100 of FIG. 1, including the power steering system 104 and test system 102 and the various components, in various embodiments. In various embodiments, the process 200 uses the control system 128 to replicate the damper 116, including the spring 117 thereof, of the power steering system 104 of FIG. 1.

As depicted in FIG. 2, the process 200 begins at step 202. In one embodiment, the process 200 begins when the power steering system 104 is connected to and coupled to the test system 102 for testing. For example, in various embodiments, the process 200 begins when the power steering system 104 of FIG. 1 is placed against the platform 126 and is coupled via the connecting apparatus 124 to the test system 102 of FIG. 1.

In various embodiments, a steering angle command is obtained at step 204. In various embodiments, the angle command is generated via the angle sensor 134 of FIG. 1 (e.g., one or more steering angle sensors) with respect to the motor 127 of FIG. 1. In various embodiments, the angle command may be generated by the test system 102, and/or in certain embodiments by any number of different profile (e.g., in certain embodiments, a CSV data string, a time array, a close-loop controller, and so on).

In addition, in various embodiments, angle sensor values are obtained at step 206. In various embodiments, the angle sensor values comprise steering angle sensor values that are initialized from the steering angle sensors 134 of FIG. 1 for the motor 127, and then subsequently change to values from step 232 (described further below) while this mode is running. Also in various embodiments, the angle sensor values comprise angle sensor signals that serve as feedback for the controller 140 to regulate the actual motor angle to the angle of the modelled motor 127. In certain embodiments, the "model angle" is the angle of the modelled motor, and is a function of only the measured torque in the context of this model (and desired model parameters (impedance values)) over time.

In various embodiments, a target angle error component is calculated at step 208. In an exemplary embodiment, the target angle error component is calculated via the processor 142 of FIG. 1 based on a model angle value obtained from both (a) the angle sensor values of step 206; and (b) the steering angle command of step 204. In certain embodiments, the first stiffness component is stored in the memory 144 as a stored value 154 and is retrieved therefrom by the processor 142. In one embodiment, the target angle error component is calculated as a difference of the model angle and the steering angle command in accordance with the following equation:

Target Angle Error=Model Angle−Steer Angle Command" (Equation 1).

Also in various embodiments, one or more stiffness coefficients are obtained at step 210. In certain embodiments, the one or more stiffness coefficients comprise one or more spring coefficients related to a desired technique for testing the power steering system 104. For example, in certain embodiments, the technique may mimic a human driver's ability to steer the vehicle. By way of further example, in certain other embodiments, a mass may be placed eccentrically on a steering wheel of the vehicle, and so on. In certain embodiments, such values may be determined from the manufacturer and/or from prior testing, or the like. Also in certain embodiments, the stiffness coefficients are stored in the memory 144 as a stored value 154 and is retrieved therefrom by the processor 142. In addition, in certain embodiments, the stiffness coefficients comprise a steer human stiffness coefficient and a steering stiffness coefficient.

Also in various embodiments, a total stiffness component is calculated (e.g., by the processor 142 as part of step 210) as a "system stiffness" that is equal to the sum of components (namely, "steer human stiffness" plus "steering stiffness") as described in [0053], in accordance with the following equation:

System Stiffness="Steer Human Stiffness"+"Steering Stiffness" (Equation 2).

In various embodiments, during step 212, an aggregate stiffness contribution (or "Spring Contribution") is calculated. In various embodiments, the Spring Contribution is calculated by the processor 142 of FIG. 1 based on a product of both the Target Angle Error of step 208 and the System Stiffness of step 210. In various embodiments, the processor 142 calculates the Stiffness Contribution as a "Spring Component" by multiplying the model angle times the system stiffness in accordance with the following equation:

Spring Contribution=Target Angle Error*System Stiffness (Equation 3), and in various embodiments is measured in deg*Nm/deg=Nm. It will also be noted that in various embodiments the stiffness value can vary in each iteration depending on the stte of the system and the human model employed.

In various embodiments, a model velocity is obtained at step 230 (described further below) for the power steering system 104. In certain embodiments, the model velocity is calculated by the processor 142 throughout the process 200. In various embodiments, the model velocity begins as the first derivative, or slope (e.g., d/dt), of the angle sensor value, and subsequently transitions to be the model angle 230. In certain other implementations, the angle and velocity may be instead utilized directly (e.g., via the first derivate of the angle sensor value from the velocity value throughout the process 200 in certain other embodiments).

In various embodiments, a damping coefficient is determined during step 216, and in various embodiments is part of the overall desired impedance. In various embodiments, the damping coefficient is calculated by the processor 142 of FIG. 1 based on adding a Steering Human Viscosity and a Steering Viscosity in accordance with the following equation:

Damping Coefficient=Steer Human Viscosity+Steering Viscosity (Equation 4).

In certain embodiments, the "steer human viscosity" refers to the target damping behavior of the driver in an exemplary embodiment. Also in an exemplary embodiment, the "steering viscosity" is the target damping behavior of other mechanical components involved in the system, such as a steering column, a rubber seal, or the like in certain embodiments.

In various embodiments, during step 218, an aggregate viscosity contribution (or "Viscosity Contribution") is calculated. In various embodiments, the Viscosity Contribution is calculated by the processor 142 of FIG. 1 based on a product of both the model velocity of step 230 and the damping coefficient of step 216. In various embodiments, the processor 142 calculates the Viscosity Contribution in accordance with the following equation:

Viscosity Contribution=Model Velocity*Damping Coefficient (Equation 5), and in various embodiments is measured in deg/s*Nm s/deg=Nm. It will also be noted that, in various embodiments, the damping coefficient value can vary each iteration depending on the state of the system and the human model employed.

In various embodiments, during step 220, torque values are obtained. In various embodiments, torque values are measured via one or more torque sensors 132 of FIG. 1 with respect to torque being applied to the power steering system 104 via the motor 127 of the test system 102, during testing of the power steering system 104.

Also in various embodiments, during step 222, the angle and damping contributions are effectively removed from the measured torque values. Specifically, in various embodiments, the processor 142 effectively takes the measured torque removes (i.e., isolates) the expected effects of the angle (e.g., from the Stiffness Contribution of step of step 212) and the Viscosity Contribution of step 218 on the measured torque values of step 220. As a result, during step 222, the processor 142 determines torque values that are attributable to inertia (i.e., that are not attributable to angle and damping contributions). In various embodiments, this is calculated in accordance with the following equation:

NonAccelTorque=Stiffness Contribution+Viscosity Contribution+Additional Friction+Externals Torque Offset Output     (Equation 6).

As referred in in Equation 6 above, in certain embodiments, the "Non Acceleration Torque" also includes factors such as "additional friction" and "torque offset". In certain embodiments, these represent other control parameters, in addition to the spring/damper factors described above. Also in certain embodiments, the additional friction may represent friction in the system, such as bearing drag, or a rubber seal. Also in certain embodiments, the torque offset represents a control-system interference (e.g., in certain embodiments, a driver bumping the steering wheel, which applies a spike of torque, or a mass placed eccentrically on the steering wheel, and so on).

Also in various embodiments, during step 224, one or more inertia, spring, damper, and/or friction target values are obtained. In certain embodiments, during step 224 another impedance value, the target (also referred to as "Total Inertia" in the equation below in an exemplary embodiment) is calculated by the processor 142 as an expected (i.e., target) value of inertia (and/or, in certain embodiments, spring, damper, and/or friction) is determined by the processor 142 of FIG. 1 in accordance with the following equation:

Total Inertia=Steer Human Inertia+Steering Inertia     (Equation 7).

It will be noted that the Total Inertia may also be the sum of any number of target inertias to represent any number of components in the system. It will also be noted that the Total Inertia should be restricted to non-zero values for mathematical robustness of this equation. In addition, in various embodiments, it will also be noted that the Steer Human Inertia value can vary each iteration depending on the state of the system and the human model employed.

In addition, in various embodiments, during step 226, the inertia contribution of step 222 is divided by the target of step 224. In various embodiments, this is performed by the processor 142 of FIG. 1. Also in various embodiments, the resulting quotient results in a desired acceleration. In various embodiments, this is performed by the processor 142 in accordance with the following equation:

In various embodiments, during step 228, a commanded acceleration level is determined. In various embodiments, the processor 142 of FIG. 1 determines the commanded acceleration level based on the following equation:

Commanded Acceleration=(Torque+NonAccelTorque+TorqueLimitOffset)/Total Inertia     (Equation 8).

Specifically, in various embodiments, during step 228, the processor 142 commands the amount of acceleration that the motor 127 of FIG. 1 needs in order to reach the inertial, spring, damper, and/or friction target, in accordance with the Commanded Acceleration of Equation 8. In certain embodiments, the "TorqueLimitOffset" value is used in Equation 8 to mathematically limit torque below a target threshold.

In various embodiments, during step 230, a velocity integration is performed. Specifically, in various embodiments, the processor 142 of FIG. 1 takes a mathematical integral of the commanded acceleration level of step 228 (i.e., mathematically integrating the commanded acceleration level), in order to reach a desired velocity command for the motor 127 of FIG. 1. In various embodiments, desired velocity is the "model velocity" multiplied by the damping coefficient (of 216) in step 218.

Also in various embodiments, during step 232, a position integration is performed. Specifically, in various embodiments, the processor 142 of FIG. 1 takes a mathematical integral of the desired velocity command of step 230 (i.e., mathematically integrating the desired velocity command), in order to reach a desired position command for the motor 127 of FIG. 1. In various embodiments, the desired position is the "model angle" that should take the place of the angle sensor value of step 206 after the model is initialized.

In various embodiments, during step 234, the position is commanded. Specifically, in various embodiments, the processor 142 of FIG. 1 provides a commanded position for the motor 127 with respect to torque applied to the power steering system 104. In various embodiments, the motor 127 applies to torque to the power steering system 104 while at the commanded position.

Also in various embodiments, as the torque is applied, various data are recorded during step 236 with respect to the power steering system 104 under test. Specifically, in various embodiments, a PID closed-loop control system may be utilized. In other embodiments, one or more various other types of control systems may be utilized.

In various embodiments, the loop then terminates at step 238. In various embodiments, as a continuous controller, although the loop may terminate at step 238, a new loop then begins at the next time step of the controller back at step 202 (above). In various embodiments, this repeats until the testing of the power steering system 104 is completed, or until the control mode is exited.

Accordingly, in various embodiments, during the process 200, the processor 142 determines a position to which the motor 127 should be moved in order to result in a torque value that reaches a desired one or more of the following: an inertia, spring, damper, or friction target. In various embodiments, the desired position for the motor is determined first by commanding an amount of acceleration that is needed to reach the target behavior for one or more of the following: inertia, spring, damper, or friction target, and then by converting the acceleration to a velocity value utilizing a first mathematical integration, and then by converting the velocity into a position value utilizing a second mathematical integration. In short, the processor 142 essentially utilizes a type of haptic feedback loop in order to determine a desired location at which the motor 127 should be positioned in order to attain the desired torque level. In various embodiments, the adjustment of the position of the motor 127 itself (rather than, for example, direct adjustment of the torque or acceleration) provides for potentially a more robust solution and/or with a lower probability of error.

It will be appreciated that the systems and methods may vary from those depicted in the Figures and described herein. For example, the system 100 of FIG. 1 (including the power steering system 104, the test system 102, and/or components thereof) may differ from that depicted in FIG. 1. It will similarly be appreciated that the steps of the process 200 may differ from those depicted in FIG. 2, and/or that various steps of the process 200 may occur concurrently and/or in a different order than that depicted in FIG. 2.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A test system for testing a power steering system for a vehicle, the test system comprising:
    a motor;
    one or more sensors configured to obtain sensor data pertaining to the motor; and
    a processor coupled to the one or more sensors and to the motor and configured to:
        determine, using the sensor data, a desired position of the motor for providing a desired amount of torque to the power steering system in order to reach one or more target behaviors: an inertia target representing an expected inertia value without angle and damping contributions, a spring target representing an expected spring value without angle and damping contributions, a damper target representing an expected damper value without angle and damping contributions, or a friction target representing an expected friction value without angle and damping contributions for the power steering system; and
        provide instructions to cause the motor to move to the desired position for providing torque to the power steering system.

2. The test system of claim 1, wherein the processor is configured to:
    determine, using the sensor data, a desired acceleration of the motor for providing the desired amount of torque to the power steering system in order to reach the target behavior for one or more of the inertia, spring, damper, or friction target for the power steering system; and
    determine the desired position of the motor based on the desired acceleration of the motor.

3. The test system of claim 2, wherein the processor is configured to determine the desired position of the motor by:
    calculating a first mathematical integral of the desired acceleration, resulting in a desired velocity of the motor; and
    calculating a second mathematical integral of the desired velocity, resulting in the desired position of the motor.

4. The test system of claim 2, wherein the processor is configured to:
    determine an amount of torque for testing that is attributable to inertia;
    determine an amount of inertia for testing; and
    determine the desired acceleration of the motor based on both:
        the amount of torque for testing that is attributable to inertia; and
        the amount of inertia.

5. The test system of claim 4, wherein the processor is configured to determine the desired acceleration of the motor by dividing the amount of torque for testing that is attributable to inertia by the amount of inertia.

6. The test system of claim 4, wherein the processor is configured to determine the amount of torque for testing that is attributable to inertia based on:
    a total amount of torque for the motor;
    a stiffness contribution for the total amount of torque; and
    a viscosity contribution for the total amount of torque.

7. The test system of claim 6, wherein:
    the sensor data includes an angle for the motor and a velocity of the motor; and
    the processor is configured to:
        calculate the stiffness contribution using the angle of the motor; and
        calculate the viscosity contribution using the velocity of the motor.

8. A control system for a test system for testing a power steering system for a vehicle, the test system having a motor, and the control system comprising:
    one or more sensors configured to obtain sensor data pertaining to the motor; and
    a processor coupled to the one or more sensors and to the motor and configured to:
        determine, using the sensor data, a desired position of the motor for providing a desired amount of torque to the power steering system in order to reach one or more target behaviors: an inertia target representing an expected inertia value without angle and damping contributions, a spring target representing an expected spring value without angle and damping contributions, a damper target representing an expected damper value without angle and damping contributions, or a friction target representing an expected friction value for the power steering system without angle and damping contributions; and
        provide instructions to cause the motor to move to the desired position for providing torque to the power steering system.

9. The control system of claim 8, wherein the processor is configured to:
    determine, using the sensor data, a desired acceleration of the motor for providing the desired amount of torque to the power steering system in order to reach the target behavior for one or more of the inertia, spring, damper, or friction target for the power steering system; and
    determine the desired position of the motor based on the desired acceleration of the motor.

10. The control system of claim 9, wherein the processor is configured to determine the desired position of the motor by:
    calculating a first mathematical integral of the desired acceleration, resulting in a desired velocity of the motor; and
    calculating a second mathematical integral of the desired velocity, resulting in the desired position of the motor.

11. The control system of claim 9, wherein the processor is configured to:
    determine an amount of torque for testing that is attributable to inertia;
    determine an amount of inertia for testing; and
    determine the desired acceleration of the motor based on both:
        the amount of torque for testing that is attributable to inertia; and
        the amount of inertia.

12. The control system of claim 11, wherein the processor is configured to determine the amount of torque for testing that is attributable to inertia based on:
    a total amount of torque for the motor;

a stiffness contribution for the total amount of torque; and
a viscosity contribution for the total amount of torque.

13. The control system of claim 12, wherein:
the sensor data include the desired velocity and angle of the motor based on the desired acceleration over time; and
the processor is configured to:
calculate the stiffness contribution using the angle of the motor; and
calculate the viscosity contribution using the velocity of the motor.

14. A method for testing a power steering system for a vehicle using a test system having a motor, the method comprising:
obtaining, via one or more sensors, sensor data pertaining to the motor;
determining, via a processor using the sensor data, a desired position of the motor for providing a desired amount of torque to the power steering system in order to reach one or more target behaviors: an inertia target representing an expected inertia value without angle and damping contributions, a spring target representing an expected spring value without angle and damping contributions, a damper target representing an expected damper value without angle and damping contributions, or a friction target representing an expected friction value without angle and damping contributions for the power steering system; and
providing, via the processor, instructions to cause the motor to move to the desired position for providing torque to the power steering system.

15. The method of claim 14, wherein the step of determining the desired position comprises:
determining, via the processor using the sensor data, a desired acceleration of the motor for providing the desired amount of torque to the power steering system in order to reach the target behavior for one or more of the inertia, spring, damper, or friction target as an input for the power steering system; and
determining, via the processor, the desired position of the motor based on the desired acceleration of the motor.

16. The method of claim 15, wherein the step of determining the desired position of the motor based on the desired acceleration of the motor comprises:
calculating, via the processor, a first mathematical integral of the desired acceleration, resulting in a desired velocity of the motor; and
calculating, via the processor, a second mathematical integral of the desired velocity, resulting in the desired position of the motor.

17. The method of claim 15, further comprising:
determining, via the processor, an amount of torque for testing that is attributable to inertia;
determining, via the processor, an amount of inertia for testing; and
determining, via the processor, the desired acceleration of the motor based on both:
the amount of torque for testing that is attributable to inertia; and
the amount of inertia.

18. The method of claim 17, wherein the desired acceleration of the motor is determined by the processor by dividing the amount of torque for testing that is attributable to inertia by the amount of inertia.

19. The method of claim 17, wherein the determining of the amount of torque for testing that is attributable to inertia is based on:
a total amount of torque for the motor;
a stiffness contribution for the total amount of torque; and
a viscosity contribution for the total amount of torque.

20. The method of claim 19, wherein:
the sensor data includes an angle for the motor and a velocity of the motor; and
the processor further comprises:
calculating, via the processor, the stiffness contribution using the angle of the motor; and
calculating, via the processor, the viscosity contribution using the velocity of the motor.

\* \* \* \* \*